June 1, 1948.  E. J. PANISH  2,442,509
CONTROL STATION
Filed Dec. 5, 1941    3 Sheets-Sheet 1

INVENTOR
Erwin J. Panish
BY Johnson Kline & Smyth
ATTORNEYS

June 1, 1948.    E. J. PANISH    2,442,509
CONTROL STATION

Filed Dec. 5, 1941    3 Sheets-Sheet 2

INVENTOR
*Erwin J. Panish*
BY *Johnson, Klise + Smyth*
ATTORNEYS

June 1, 1948. E. J. PANISH 2,442,509
CONTROL STATION
Filed Dec. 5, 1941 3 Sheets-Sheet 3

INVENTOR
Erwin J. Panish
BY Johnson, Kline & Smyth
ATTORNEYS

Patented June 1, 1948

2,442,509

UNITED STATES PATENT OFFICE 2,442,509

CONTROL STATION

Erwin J. Panish, Bridgeport, Conn.

Application December 5, 1941, Serial No. 421,823

20 Claims. (Cl. 192—.01)

The present invention relates to an improvement in control stations having common control means for performing a plurality of dissimilar control operations in a correlated manner.

More specifically, the present invention relates to improvments in control stations having a common controller for the speed or power generated by a prime mover and for a clutch or reverse gear for coupling said prime mover to a driven device, and is particularly applicable in marine installations as disclosed in my copending applications Serial No. 399,949, filed June 26, 1941, now Patent No. 2,326,796, granted August 17, 1943, and Serial No. 399,951, filed June 26, 1941.

In my aforesaid copending applications, I have described a marine control station wherein a single controller movable between two angular limiting postions adjusts the engine throttle mechanically for idling speed at an intermediate position and simultaneously initiates operation of an electrically driven reverse gear to move the clutch to neutral or disengaged position. On movement of the controller a short distance on opposite sides of said neutral position, the controller initiates alternate forward or reverse clutch-engaging operation of the reverse gear and adjusts the throttle for engine speeds only slightly advanced, or not advanced at all, above idling speed.

Moreover, in the said copending applications, electromagnetic means is disclosed, comprising a pair of solenoid-operated, controller-engaging latches which prevent movement of the controller beyond said clutch-engaging positions until the operation of the reverse gear has engaged the clutch. The controller-restraining latch then becomes inoperative so as to permit opening of the throttle, while the other latch solenoid remains energized, until the clutch has been returned to neutral position or moved therethrough to the opposite engaged position. By this means, the solenoids prevent undue acceleration of the engine before engagement of the clutch, so that the machinery is protected from undue strain, and the boat from sudden lurching in forward or reverse direction.

In marine installations, the control station is usually located in the pilot house or on the bridge of a vessel so close to the compass that the magnetic field of the latch solenoids in the control station while energized, causes excessive deviation of the compass. To eliminate this when not maneuvering and to save battery current which energizes the solenoids at the same time, I have previously provided the control with a master switch operating to open current supply circuits including the latch solenoid circuits. But with this arrangement, before the clutch could be shifted to neutral or opposite engaged position, it was necessary for the pilot to remember that the switch is open and then to reclose it. In the excitement and mental stress of an emergency, the pilot might forget about the master switch and be unable to effect the desired control of the engines, and serious damage might result. If the maneuver called for full speed astern and the controller were so shifted, while the clutch was engaged and the control circuits open, the clutch would remain in ahead position and the boat would be driven ahead at full speed into damage or destruction. If not withstanding this faulty operation by the pilot there is still time to avoid catastrophy, the first impulse would be to turn on the master switch. But this would lead to further trouble, for the solenoid would set the astern position latch to lock the controller in "full speed astern" position, that is, beyond the position in which the reverse clutch is operated. To correct this condtion, the master switch would have to be opened again, the controller returned to reverse clutch-operating range, the master switch then reclosed, and the controller again moved toward the desired clutch-reversing position. Only in the most casual maneuver would time permit the correction of the faulty operation of operating the controller without first closing of the master switch.

It is an object of the present invention to provide automatic means for overcoming these difficulties, both the compass interference and the faulty operation possible above referred to, while still retaining the advantageous use of the electromagnetic latches which are provided to prevent other difficulties. According to the present invention, this is done by providing means in the control station for automatically deenergizing both forward and astern electromagnetic latch means as long as the controller is positioned beyond one or either of the clutch-engaging positions, toward high speed position, and to automatically render said electromagnetic latch means again operative upon return of the controller to clutch-operating or idling speed position.

With the provision of such means, the electromagnetic latch means is maintained normally unenergized and does not cause objectionable deviation in the compass except when maneuvering and then only when the controller is in intermediate, reverse, or one of the clutch-shifting positions during which time accurate readings from the compass are not required. Yet, the pilot may, at any time, control the vessel by merely operating the control levers, the master switch being used only to shut down the system and conserve battery current when the vessel is tied up or moored.

In the preferred form of this invention, when the control lever is set for full-speed ahead, both latches are released, but when the lever is returned to clutch control position, the astern position latch automatically becomes effective. When the control lever is operated in a normal way, this latch will prevent movement of the lever beyond reverse gear engaging position until the reversing operation is completed. However, if the lever is thrown too quickly from full speed ahead to full speed astern position, the latch might not have time to come up and the momentary engagement of the contacts for unclutching and then reclutching in reverse may result in the desired operations not being performed and the vessel will continue at full speed ahead with the possibility of great damage being done.

This is obviated by the present invention by maintaining the circuits for astern operation closed at the control station for a substantial part, preferably the entire travel of the controller in the astern operating position. Hence, regardless of how fast the controller is moved, the closing of the astern circuits is assured.

Other features and advantages will hereinafter appear.

The means whereby the aforesaid objects are accomplished are illustrated by the following description, referring to the accompanying drawings, in which.

The improvements of the present invention are illustrated as applied to the control station for the throttle and the clutch or reverse gear actuating mechanism of a marine installation, more fully described in my copending applications Serial No. 399,949, filed June 26, 1941, now Patent No. 2,326,796, granted August 17, 1943, and Serial No. 399,951, filed June 26, 1941.

Figure 1:
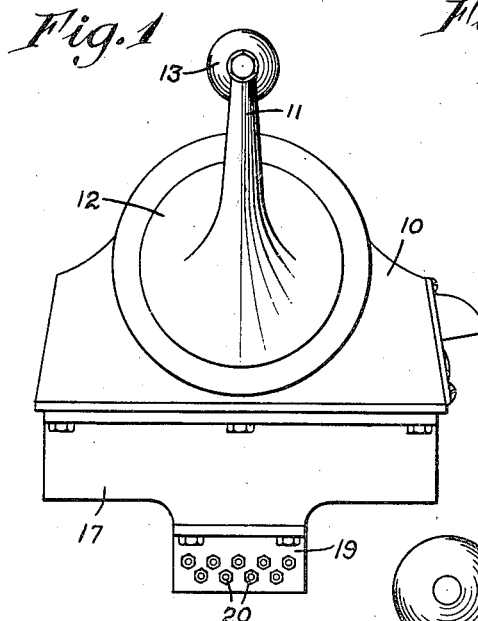
Figure 1 is a side view of the control station according to the present invention.
Figure 2:
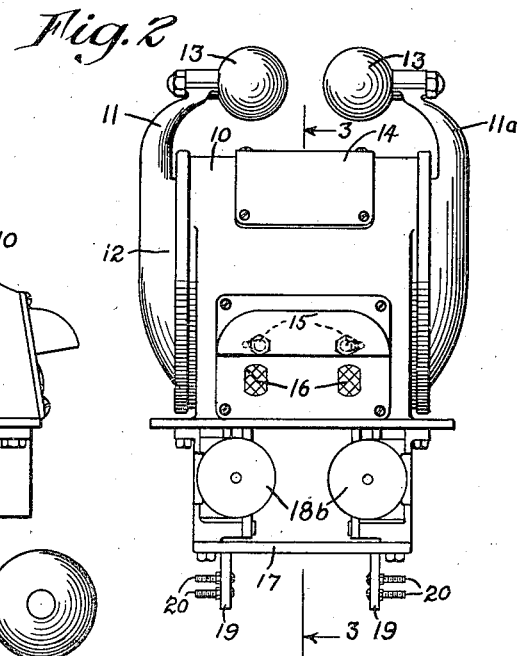
Fig. 2 is a front view of the control station of Fig. 1, comprising a controller for two engines and two reverse gears.

As illustrated in Figs. 1 and 2, the control station of the present invention is outwardly constructed in the same manner as the control station of my copending application Serial No. 399,949, now Patent No. 2,326,796. It comprises a housing 10, adapted to be mounted on a control platform, having a controller 11 mounted for pivotal movement about the horizontal axis of a circular end cover plate 12. The housing may also carry a second controller 11a for controlling a second engine and clutch, the two controllers having spherical grip members 13 positioned adjacent each other for simultaneous manipulation with one hand. At the top of the housing 10, a removable cover plate 14 provides access, when it is desired, to the interior of the housing, while at the base of the housing, a pair of master switches 15 are provided for rendering the control station circuits operative or inoperative at will, and a pair of signal lights 16 for indicating whether or not the clutch-operating motor is energized.

A frame 17 attached to the base of the housing 10, carries latch solenoids 18b and latch mechanisms operated thereby. The circuits of the solenoids are also controlled by the master switches 15. A pair of terminal plates 19 secured to the frame 17 have a number of terminals 20 for connecting the electric control circuits in the control station with devices to be controlled thereby.

Figure 3:
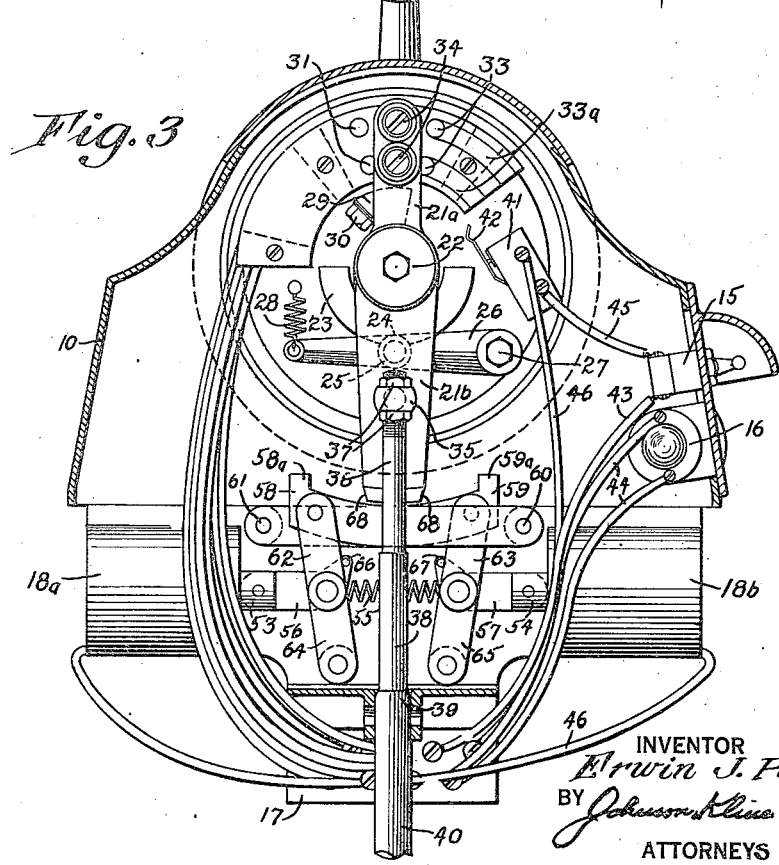
Fig. 3 is a cross-section substantially along the line 3—3 of Fig. 2.

Referring now to Fig. 3, the cover plate 12 carries on its inward side, within the housing 10, an operating lever 21 comprising oppositely extending radial portions 21a and 21b, adapted to rotate with the cover plate 12 and controller 11, and secured thereto, for instance, at the hub 22.

The hub 22 carries a substantially semicircular cam plate 23 having a semicircular recess 24 adapted to engage a roller 25 carried by a tangentially positioned lever 26 which is supported at one end by a pivot 27, while its opposite end is yieldably urged by the tension spring 28 about pivot 27, so as to urge roller 25 against the peripheral surface of the cam plate 23. When the roller engages recess 24, it acts as an impositive detent to retain hub 22, the associated lever 21, and controller 11 impositively in a predetmined (for instance, vertical) position as illustrated. Upon angular movement of the said members away from said position roller 25 merely rides out of the recess and rolls along the periphery of cam plate 23.

A stop lug or sector 29, secured to the casing 10, extends into the path of cam plate 23, so that engagement of the opposite ends of the latter with the opposite sides of the sector limits the angular movement of lever 21 and controller 11 about their pivotal mounting. An adjustable stop 30 is provided on the sector 29 to vary the right-hand limit of motion of said controller.

Adjacent the upper radial extension 21a of lever 21, a fixed arcuately spaced contact plate of suitable dielectric material is provided having thereon three pairs of contacts 31, 32 and 33, disposed at angularly spaced intervals about hub 22, and each pair being radially spaced from the pivot of lever 21. In Fig. 3, the left and right-hand pairs of contacts 31 and 33 are visible, while the intermediate pair 32 is hidden by the extension 21a of lever 21.

Lever 21 carries a pair of spring-pressed contactors 34, electrically connected, and adapted to engage the said pairs of contacts successively on angular movement of lever 21 about its pivot, thus providing a conductive bridge for establishing a circuit between the members of the respective pairs of contacts. In the vertical position illustrated in Fig. 3, in which lever 21 is yieldably positioned by engagement of the aforesaid detent means, contactors 34 bridge the central pair of contacts 32.

The downwardly extending portion 21b of lever 21 carries a pivotal stud 35 to which a rod 36 is secured by the nuts 37. The rod 36 is telescopically movable in a sleeve 38, pivotally supported at a ball-and-socket joint 39, secured to the frame 17. The rod 36 is adapted to operate a Bowden wire, enclosed in a sheath 40, for controlling the throttle, especially of an internal combustion engine, which, in the present illustration, drives the propeller shaft of a vessel through a clutch or reverse gear, not shown.

When the lever 21 and controller 11 are vertically positioned as in Fig. 3, the rod 36, and hence the Bowden wire is pushed downward to the limit of its motion, and is adapted in this position to adjust the throttle 70 of the engine for idling speed. Upon movement of lever 21 to either position wherein contacts 31 or 33 are engaged, the Bowden wire is retracted upward by a small and generally insignificant extent, so that the engine is either slightly or not at all accelerated, since the movement of the pivotal stud 35 securing rod 36 to the lever 21 is principally at right angles to the direction of telescopic movement of the rod 36. Further movement of lever 21 toward either limiting position, however, pulls rod 36 outward from its sleeve 38, withdrawing the Bowden wire through its sheath 40, and progressively increasing the speed of the engine to full speed setting, until movement of the lever 21 is arrested by reaching one of its limiting positions determined by the sector 29.

According to the present invention, a self-closing switch 41 is provided, having a switch-operating member 42 extending into the path of the cam plate 23. Preferably, the switch 41 is of the micromatic type described in United States Patent No. 1,960,020, issued May 22, 1934, comprising a switch of the snap-acting type requiring extremely slight movement (of the order of about .001 inch) of the operator to move the switch from open to closed position or vice versa.

Switch 41 is so positioned that upon movement of the lever 21 and controller 11 to the left, just beyond the position in which contacts 31 have been bridged by contactors 34, the end of the cam plate 23 engages the switch operator 42 to open switch 41, while upon return movement of said lever and controller, the switch operator is released at the same point, permitting the switch to open.

Figure 7:
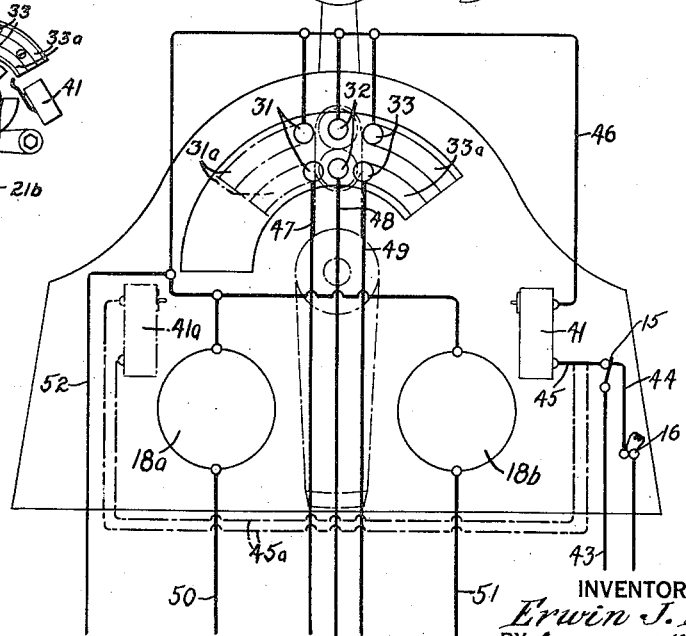
Fig. 7 is a wiring diagram, including the switches and solenoids associated with one controller of the control station of Fig. 3.
Figure 8:
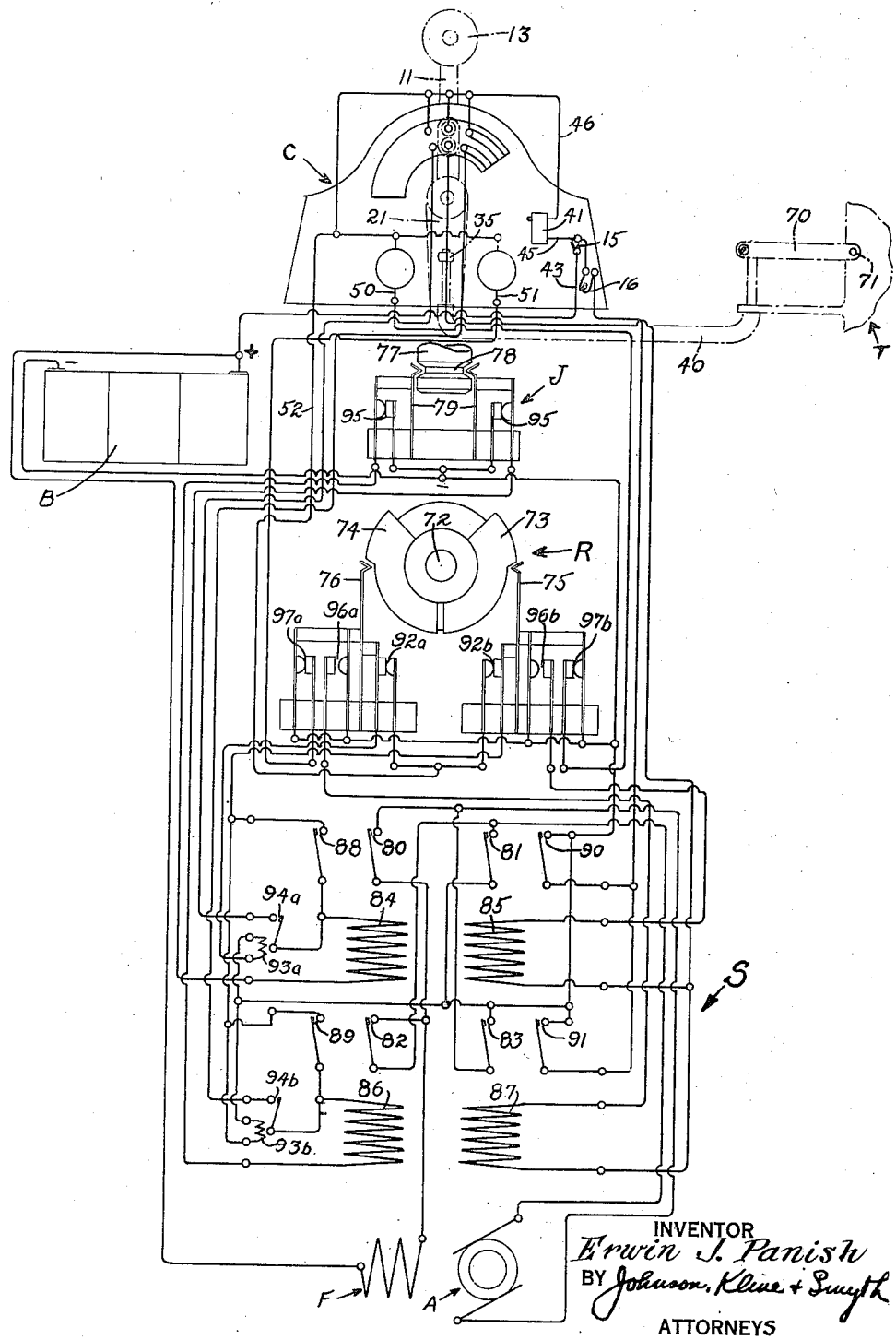
Fig. 8 is a wiring diagram including the control station circuits of Fig. 7 and showing their application in a marine control system as described in my copending application Serial No. 399,951, filed June 26, 1941.

Referring now to the wiring diagram of Fig. 7, the electric control circuits are supplied with power from a source of current as for instance the battery B in Fig. 8, through lead 43, connected to the master switch 15. From the latter, current is supplied to the signal lamp 16 through lead 44 and to switch 41 through conductor 45. The opposite terminal of switch 41 is connected by lead 46 to one of each pair of terminals 31, 32 and 33, and also to the pair of solenoids 18a and 18b. The latter are connected by leads 50 and 51 to automatic circuit control means operated by the reverse gear and thence to a ground. The opposite terminals of the three pairs of contacts 31, 32 and 33 are connected by leads 47, 48 and 49 respectively to electrical control devices which are not shown here, but are fully described in my copending application, Serial No. 399,951 for initiating operation of the reverse gear to move the clutch to or from either engaged position.

Namely, bridging of the circuit through the central pair of contacts 32 is adapted to initiate operation of the reverse gear to move the clutch to neutral or disengaged position, while bridging of contacts 31 or 33 by contactors 34 is adapted to initiate operation of the reverse gear to move the clutch respectively to forward engaged or reverse engaged position. Automatic circuit control means, mentioned above, in the respective circuits of solenoids 18a and 18b are operated by the reverse gear so as to close both solenoid circuits as long as the clutch is disengaged and to open one solenoid circuit or the other upon engagement of the clutch. Solenoid 18b is deenergized upon engagement of the clutch for forward operation, and solenoid 18a is deenergized upon engagement of the clutch for reverse operation.

The lead 52 deriving current from lead 46 through master switch 15 and micromatic switch 41 is connected to auxiliary circuit control means, operated by the reverse gear, for rendering the initiating circuit, completed by bridging of clutch-engaging contacts 31 or 33, inoperative after automatic clutch-engaging operation of the reverse gear has commenced.

It will be observed that the control circuits for initiating reverse gear engaging operations as well as the circuits of the latch solenoids 18a and 18b, are controlled according to the present invention, not only by the master switch 15, but also by switch 41 in series therewith.

Referring once more to Fig. 3, solenoids 18a and 18b are disposed at opposite ends of the control station and carry a pair of mutually aligned armatures 53 and 54, normally urged together, or outwardly from the solenoids, by a tension spring 55 connected to the said armatures respectively by pivoted links 56 and 57. When the solenoids are energized, armatures 53 and 54 are retracted in opposite directions, stretching spring 55.

A pair of dogs or latches 58 and 59, carried by fixed pivots 60 and 61 on the frame 17, are provided at their free ends with projections 58a and 59a, and the same ends are joined to the pivoted links 56 and 57 respectively by links 62 and 63. The pivoted junctions of links 62 and 63 with links 56 and 57 are respectively supported by links 64 and 65 which have their opposite or lower ends attached at fixed pivots to the frame 17.

When the armature 53 or 54 is retracted into the corresponding solenoid, the linkage associated therewith moves the corresponding latch 58 or 59 upward to the position shown in Fig. 3, wherein projection 58a or 59a extends into the path of the lower end of the portion 21b of lever 21, thereby limiting angular movement of said lever about its pivot. The two latches or dogs 58 and 59 are so disposed that the lower end of lever 21 engages projection 58a or 59a respectively when contacts 33 or 31 are engaged by the bridging contactor means 34. Accordingly, when the solenoids 18a and 18b are energized, movement of lever 21 and controller 11 is limited to the range between the two initial clutch-engaging positions, defined by the said pairs of contacts.

Upon deenergization of either solenoid, the corresponding armature 53 or 54 is moved inward by spring 55, and the associated linkage moves latch 58 or 59 downward, releasing lever 21 for movement beyond the corresponding initial clutch-engaging position, to the adjacent engine-accelerating range.

Stop lugs 66 and 67 integral with links 64 and 65 are adapted to engage the right and left hand ends of links 62 and 63 respectively, to limit the retraction of armatures 53 and 54 by the solenoids 18a and 18b. These stop means are so arranged, that when armature 53 or 54 is retracted, links 62 and 64, or links 63 and 65, are positioned just short of dead center alignment. As a result, downward pressure upon the latch or dog 58 or 59 tends to collapse the corresponding linkage, and withdraw the corresponding armature from its solenoid, thereby releasing lever 21 from the latch.

A pair of cam surfaces 68 on the lower end of the lever portion 21b is adapted when it engages the projections 58a or 59a to exert downward pressure on the corresponding latch, if manual force is applied to the controller 11 to move it toward its adjacent limiting position, so that if the spring 55 fails to release the latch upon deenergization of the corresponding solenoid, the latch will be released by slightly increased manual force applied to the controller 11.

In the operation of the device, according to this invention, assuming controller 11 and lever 21 to be positioned as in Fig. 3, that is in vertical position, contactor means 34 has completed a circuit through contacts 32, initiating operation of the reverse gear to move the clutch to disengaged position. The engine throttle is adjusted for idling speed by the Bowden wire connection. Switch 41 is released by cam plate 23, and accordingly, solenoids 18a and 18b are both energized so that latches 58 and 59 are both operative to limit movement of the lever 21 and the controller 11.

Figure 4:
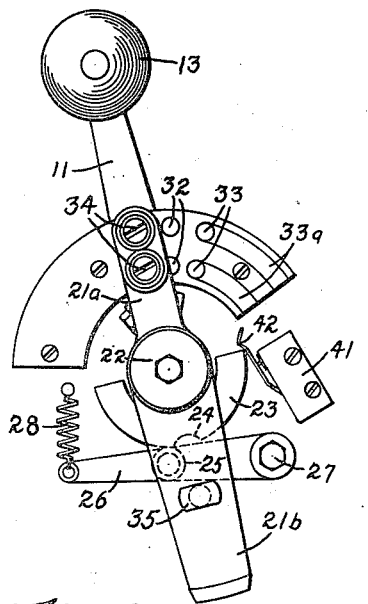
Fig. 4 is a detail of the controller of Fig. 3 in a clutch-engaging position and of the switch means operated thereby.

Assuming that it is now desired to operate the vessel in forward direction, controller 11 is moved to the left to the position indicated in Fig. 4, wherein contacts 31 are bridged by contactor means 34. Latch 59 temporarily prevents movement of lever 21 and controller 11 beyond this position. The operation of the reverse gear to move the clutch to forward engaged position is initiated by the circuit completed through contacts 31, and the throttle is slightly advanced above, or remains at, idling setting.

Clutch-engaging operation of the reverse gear automatically opens the circuit through solenoid 18b upon engagement of the clutch, deenergizing solenoid 18b and releasing the latch 59. Lever 21 and controller 11 are thereby released for movement beyond clutch-engaging position, as shown in Fig. 5, whereby the throttle may be opened at will and the engine accelerated.

Figure 5:
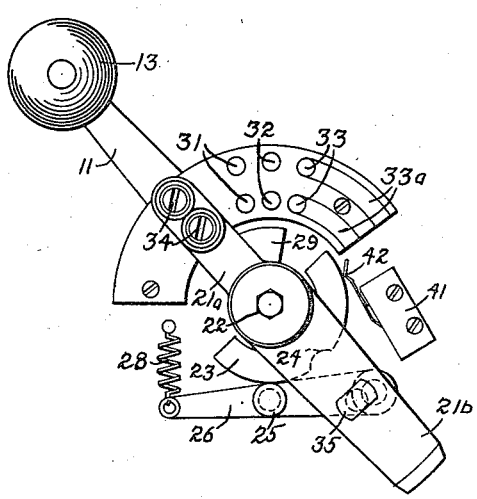
Fig. 5 is a detail view similar to Fig. 4, but illustrates the controller in nomal cruising position, wherein the clutch is engaged and the throttle advanced.

But movement of the said lever beyond the position illustrated in Fig. 4, to that of Fig. 5, causes cam plate 23 to engage the switch operator 42, thereby opening the switch 41. This renders solenoid 18a as well as 18b inoperative, releasing the latches 58 and 59 so that the magnetic field of solenoid 18a no longer interferes with the compass adjacent the control station. As long as the vessel continues to be operated forwardly with the throttle adjusted above the setting corresponding to that of initial clutch-engaging position of the controller 11, that is, to the left of the position shown in Fig. 4, as would be the case under normal cruising conditions, solenoids 18a and 18b remain deenergized. It will also be observed that the control circuits through contacts 31, 32 and 33 are also inoperative as long as switch 41 remains open.

If the controller 11 is moved back to a position with the clutch-operating range, switch 41 is released by cam 23, and closes automatically, reenergizing solenoid 18a and reestablishing the circuit to contacts 31, 32 and 33. Solenoid 18b at first remains deenergized; but if the controller 11 is moved back to the vertical position shown in Figs. 3 and 7, wherein contacts 32 are bridged, the clutch is returned to neutral position, and thereby reenergizes solenoid 18b by the automatic circuit control means connected to the lead 51.

If the controller 11 is moved instead to the right from the vertical or clutch-disengaging position, the lower end of lever 21 encounters latch 58, controlled by solenoid 18a, and is temporarily held in this position, wherein contacts 33 are bridged and limiting the throttle setting substantially to idling speed. Bridging of the latter contacts initiates operation of the reverse gear to move the clutch to reverse engaged position, automatically deenergizing solenoid 18a by interrupting the circuit through lead 50, and thereby releasing the controller for varying the speed of the engine at will, although the adjustable stop means 30 ordinarily prevents full movement of the controller 11 to the right to increase the throttle setting to full speed, since it is generally not desired to operate the vessel at full speed astern.

In the construction illustrated in Figs. 3 to 5, it will be observed that solenoid 18b, controlling latch 59, continues to be energized under these conditions, but since the compass is generally not used during astern operation of the vessel, interference with its field by the field of the energized solenoid is of no particular disadvantage.

Figure 6:
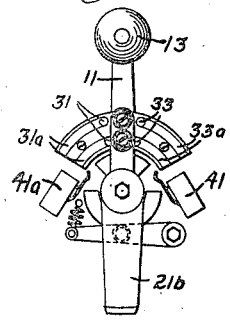
Fig. 6 is a detail similar to Fig. 5, on a reduced scale, showing the controller in neutral position, and including a modification of the switch means of the present invention.

However, if desired, a second switch 41a, may be connected in series with switch 41 by means of leads 45a, indicated in dot-dash lines in the wiring diagram of Fig. 7 (lead 45 being interrupted between the two leads 45a), switch 41a being symmetrically disposed to switch 41, as illustrated in Fig. 6, on the opposite side of the lever 21, so that cam plate 23 is adapted to engage this switch in the same manner as switch 41 when the lever 21 is moved just beyond the clutch-engaging contacts 33 for operation of the vessel astern. In this case, solenoids 18a and 18b are both deenergized together with the control circuits through the contacts 31, 32 and 33, whenever the clutch is engaged either for reverse or forward operation, and the throttle advanced beyond either adjustment corresponding to the initial clutch-engaging positions of the controller 11.

In either case, one of the solenoids 18a or 18b, is energized if the controller is moved to a position within the clutch-operating range without disengaging the clutch, while if the clutch is disengaged, both solenoids are energized. Since the throttle is adjusted within the clutch-operating range at substantially idling speed, it is extremely unlikely that the operator would have occasion to use the compass when the controller is moved to this position. Hence, the magnetic interference of the energized solenoids under these conditions is of no consequence.

Due to the inertia and friction of the moving parts of the latch-operating mechanism or linkage, a lapse of time always occurs between the instant that either solenoid 18a or 18b is energized, and the instant the corresponding latch 58 or 59 becomes operative to limit movement of the lever 21.

In operating the controller 11 to move the clutch to neutral position from forward engaged position in Fig. 2 or from either engaged position in Fig. 6, the lever 21 is impositively arrested in clutch-disengaging position by the detent means comprising recess 24 on the cam plate 23, and spring-pressed roller 25. Accordingly, there is little likelihood that the operator would have any difficulty in moving the lever 11 to this position. Thus, resetting of latches 58 and 59 would have ample time before another clutch-engaging operation was attempted even if the response thereof to closure of switch 41 or 41a were extremely sluggish.

However, when it is desired to shift the reverse gear suddenly from forward engaged position to reverse engaged position in the device of Fig. 2, or from either engaged position to the opposite engaged position in Fig. 6, the possibility exists that lever 21 might pass beyond the intermediate clutch-operating range, wherein it would normally be confined by latches 58 and 59 until clutch engagement was completed by the reverse gear.

Referring to Fig. 3, if rapid manipulation of lever 21 and controller 11 is from left to right, and the latch 58 failed to rise before the lever 21 reached latch-engaging position, the contactor 34 would be free to pass beyond contacts 33 before the clutch had even been disengaged from forward operating position by the reverse gear. Movement of lever 21 to the right beyond latch-engaging position would therefore accelerate the engine with the clutch still engaged for forward operation, and the vessel would be driven forwardly at high speed, rather than astern in the desired direction. The subsequent resetting of the latch 58 would then prevent lever 21 from moving back to the clutch-operating range. In order to release the latch 58, the master switch 15 would have to be momentarily opened to deenergize the solenoid 18a.

In order to eliminate the possibility of such an occurrence, a pair of arcuate contact strips 33a are provided according to the present invention on the dielectric contact plate carrying the contacts 31, 32 and 33, said strips being electrically connected to the latter pair of contacts and extending to the end of the dielectric plate. The said contact strips are so positioned, that they are adapted to be engaged by the bridging contactor means 34 on lever 21 when the latter is moved to the right beyond the position in which contacts 33 are engaged, and wherein latch 58 is adapted to limit movement of the lever 21.

By this arrangement, if latch 58 should fail to intercept movement of lever 21 to the right, the reverse gear control circuit through contacts 33 would remain established by cooperation of the bridging contactors 34 with strips 33a, insuring operation of the reverse gear to the desired reverse engaged position.

The resulting operation of the reverse gear to reverse engaged position automatically deenergizes solenoid 18a and releases latch 58, so that the latter could no longer interfere with the return of the controller 11 to neutral or forward engaged position. The operation of the reverse gear also opens the control circuit through contacts 33 so that the fact that contactors 34 still bridge the latter pair of contacts has no further effect.

When a second switch 41a is also provided as indicated in Fig. 6, and by dot-dash lines in Fig. 7, similar arcuate conductor strips 31a are also provided electrically connected to contactor 31 and extending to the left-hand end of the dielectric plate carrying the pairs of contacts. If latch 59 fails to intercept movement of the lever 21b during sudden movement of the controller 11 and lever 21 from reverse engaged position to forward engaged position, and the lever 21 is moved beyond the position engaging contacts 31, the circuit through contacts 31 will be maintained by engagement of the contactor 34 with contact strips 31a, insuring operation of the clutch by the reverse gear to forward engaged position. Said operation of the reverse gear, as before, would deenergize solenoid 18b upon engagement of the clutch in the desired position, and thereby release latch 58 so that lever 21 is free to be moved back to clutch-operating range between the contacts 31 and 33. As above, the reverse gear actuating mechanism also automatically opens the control circuits through contacts 31 upon engagement of the clutch so that continued engagement of the contactor 34 with contact strips 31a has no further effect.

Thus, during operation of the vessel at cruising speed, according to this invention, both solenoids controlling the latches are deenergized so that the magnetic fields thereof cause no interference with the indications of the compass, while the solenoids are normally energized as required to limit opening of the engine throttle until the clutch is engaged. Should the solenoids fail to operate rapidly enough, the provision of the contact strips associated with the clutch-engaging pairs of contacts eliminates the possibility of failure in response to reversing manipulation of the controller for operation of the reverse gear.

Fig. 8 illustrates the application of the improved control station circuit of Fig. 7 in a motor driven, reverse gear clutch-operating and mechanical throttle-control system suitable for a marine installation, substantially resembling the control system of my copending application Serial No. 399,951, filed June 26, 1941.

The system comprises the control station of Fig. 7 indicated at C, comprising the controller 11 and lever 21, operated thereby, which carries the pivoted stud 35 connected by Bowden wire 40 to the free end of the throttle lever 70 of the engine indicated at T and pivoted at 71 to the engine frame. The throttle is advanced upon downward movement of the free end of the throttle lever 70 in response to a pull exerted by the Bowden wire 40, and retarded by movement in the opposite direction.

Portions of the reverse gear clutch operating mechanism are shown schematically at R and J. At R, the end of the reverse gear operating shaft 72 is shown carrying a pair of cams 73 and 74 respectively adapted, upon rotation of the shaft 72 in clockwise or counterclockwise direction, to engage switch-operating arms 75 and 76 alternately for operating switch means controlled thereby. The cams are shown in the position occupied when the reverse gear clutch is in neutral position or disengaged. The switches operated by the said cams constitute automatic means for controlling energization of latch solenoids 18a and 18b in the control station C, as well as for controlling automatic relay means for completing clutch operations initiated by predetermined movements of the controller 11. Upon counterclockwise rotation of shaft 72 and cams 73 and 74 through a limited angle, the reverse gear is engaged for forward operation of the device driven by the engine, and upon clockwise rotation from said position through a corresponding angle, the reverse gear clutch is engaged for reverse operation. After engaging the clutch in either position, the shaft 72 reaches a limit or stop position.

A reversible driving motor comprising a field winding F and armature A is coupled through suitable mechanism with the shaft 72 and is adapted to drive it in either direction over its operating range. Power for the motor, and for the control circuits of the system, is derived from a battery indicated at B.

The reverse gear mechanism includes an automatic cutout device at J which interrupts motor operation upon engagement of the clutch, including a cylindrical cam member 77, having thereon an annular groove 78, adapted upon movement in either axial direction to engage switch arms 79 to effect control of switches operated thereby. The cam member 77 is normally disengaged from the switch arms 79, but after clutch-engaging operation of the reverse gear, when the shaft 72 is arrested by reaching a limiting position, continued rotation of the motor thereafter causes the member 77 to move axially in one direction or the other, and thereby operates cutout switches associated with switch arms 79.

The motor switch shown at S includes two switches 80 and 81 normally urged to open-circuit position, which upon closure, connect the field F and armature A of the motor with the battery B for operation in one direction, while corresponding switches 82 and 83, when closed, reverse the current in the armature and operate the motor in reverse direction.

A pair of electromagnets 84 and 85 are each adapted upon energization to close switches 80 and 81, while electromagnets 86 and 87 are correspondingly adapted upon energization to close switches 82 and 83. A mechanical interlock, not shown, prevents simultaneous closure of both pairs of switches.

A holding switch 88, operated simultaneously with motor switches 80 and 81, is adapted to maintain the energizing circuit of armature 84 upon closure of the said motor switches, while a corresponding holding switch 89 included in the circuit of electromagnet 86 is similarly adapted to maintain the latter energized after closure of switches 82 and 83.

A pair of switches 90 and 91, connected in parallel, are closed and opened together with the respective pairs of motor switches, and control the circuit of the signal lamp 16 in the control station C so that the latter is illuminated whenever the motor switches are closed.

As stated above with reference to Fig. 7, the master switch 15 is connected by lead 43 to the positive terminal of the battery B.

All parts of the system are shown in positions corresponding to idling speed adjustment of the throttle and disengagement of the reverse gear clutch. Cams 74 and 73, by releasing switch arms 75 and 76, allow a pair of limit switches 92a and 92b to remain closed, establishing a control circuit from the battery B, master switch 15, normally closed switch means 41, leads 46 and 52, to limit switches 92a and 92b and thence respectively to a pair of auxiliary electromagnets 93a and 93b, which are permanently connected to the negative pole of the battery B.

Resulting energization of electromagnets 93a and 93b maintains a pair of initiating switches 94a and 94b closed to establish initiating circuits respectively from the clutch-engaging contacts 31 and 33 in the control station C to the electromagnets 84 and 86.

Upon movement of the controller 11 to the left, so as to bridge the pair of contacts 31, a circuit is completed from lead 46, energized through master switch 15 and automatic switch 41, to electromagnet 84. Upon energization of this electromagnet, motor switches 80 and 81, holding switch 88, and signal lamp switch 90 are simultaneously closed. The motor is thereby energized to move the shaft 72 in counterclockwise direction to engage the clutch for forward operation.

The clutch is already engaged by the time cam 74 encounters the switch operating lever 76, although the clutch-operating mechanism is not yet fully operated. Upon engagement of cam 74 with arm 76, limit switch 92a opens deenergizing electromagnet 93a and allowing initiating switch 94a to open. As a result, the circuit from contacts 31 in the control station is rendered temporarily inoperative, but the operation of the motor in forward clutch-engaging direction is continued as a result of continued energization of the electromagnet 84 through holding switch 88.

After the clutch is fully operated and the shaft 72 reaches the limit of its counterclockwise rotation, continued rotation of the motor causes movement of the cam 77 in axial direction so that switch arms 79 are engaged to open switches 95 in the automatic cutout device J. These switches are included in the circuits of electromagnets 84 and 86. Thus, the circuit through the electromagnet 84 is automatically interrupted, releasing motor switches 80 and 81, holding switch 88, and signal lamp switch 90, and thereby interrupting motor operation.

Upon alternate movement of the control lever 11 to the right, so as to bridge contacts 33, a circuit is established through initiating switch 94b to electromagnet 86, thereby causing closure of the reverse motor switches 82 and 83, holding switch 89, signal light switch 91, causing the motor to move the reverse gear to reverse engaged position. In this case, shaft 72 moves clockwise, and cam 73 engages the switch arm 75 upon or after engagement of the clutch, thus opening limit switch 92b to deenergize electromagnet 93b, and allowing initiating switch 94b to open, thus rendering the initiating circuit through contacts 33 temporarily inoperative. Electromagnet 86, however, continues to be energized by the holding circuit through switch 89.

As the reverse gear reaches the limit of its reverse clutch-engaging operation, continued rotation of the motor in reverse clutch-engaging direction moves cam 77 axially thereby opening the cutout switches 95, and deenergizing electromagnet 86, so that motor switches 82 and 83, holding switch 89 and signal light switch 91 are simultaneously opened, and operation of the motor interrupted.

In either case, when the motor stops, cam 77 returns to its normal position, automatically reclosing cutout switches 95.

During clutch-engaging operation of the reverse gear, movement of the arms 76 or 75 respectively by cams 74 or 73, selectively closes one of a pair of limit switches 96a and 96b to establish a circuit from the central contacts 32 at the control station C to elecromagnets 87 and 85 respectively. Closure of switch 96a or 96b takes place after switches 92a or 92b have opened. Thus upon return movement of the controller 11 to the vertical position wherein the circuit through contacts 32 is completed, electromagnet 87 or 85 is selectively energized, depending upon the engaged position to which the clutch has been previously moved. Energization of electromagnet 87 is adapted to close motor switches 82 and 83, causing the motor to rotate in reverse direction for moving the clutch from forward engaged position toward neutral position. While holding switch 89 has thereby closed, it is not adapted to energize the electromagnet 86, since the circuit of the latter is interrupted at the open limit switch 92a. As the clutch approaches neutral position, cam 74 releases arm 76, thereby opening switch 96a, deenergizing electromagnet 87, releasing motor switches 82 and 83 so that motor operation is interrupted and the clutch comes to rest in neutral position.

Similarly, when the clutch is in reverse engaged position, switch 96b is closed instead, and upon movement of the controller 11 to the vertical position so that the circuit through contacts 32 is established, electromagnet 85 is energized causing forward motor switches 80 and 81 to be closed. The motor operates forwardly to return the clutch from reverse engaged position to neutral position. When cam 73 releases arm 75, limit switch 96b opens to deenergize electromagnet 85, releasing motor switches 80 and 81, and thereby interrupts motor operation as the clutch reaches neutral position. In this case, while holding switch 88 is also closed, it is not adapted to energize electromagnet 84 since the circuit of the latter is open at limit switch 92b. Limit switches 92a and 92b are reclosed when the clutch reaches neutral position so that the original condition of the system is reestablished.

For operating the clutch from one engaged position directly to the other, the controller is moved, for instance, from extreme left to the right to engage contacts 33, cam 74 being engaged with switch arm 76. As explained with reference to Fig. 7, this movement of the controller allows switch 42 to close and energizes electromagnet 93b through limit switch 92b which has remained closed. As a result, initiating switch 94b closes and accordingly electromagnet 86 is energized through the control station, contacts 33 and switch 94b, causing motor operation in reverse direction. When the clutch passes through neutral position, cams 73 and 74 close limit switch 92a to establish the holding circuit of electromagnet 86 through holding switch 89, and thereafter open limit switch 92b so that electromagnet 93b is deenergized. From this point, the operation is the same as that described above from neutral to reverse engaged position.

Correspondingly, upon operation of the clutch directly from reverse engaged to forward engaged position, bridging of contacts 31 by movement of controller 11 from the extreme right to the left, first energizes electromagnet 84 through initiating switch 94a which is closed by energization of electromagnet 93a through limit switch 92a, until the clutch passes through neutral position. Reclosure of limit switch 92b establishes the holding circuit to electromagnet 84 through holding switch 88. Thereafter the operation is the same as though the clutch were operating from neutral to forward operating position.

The latch solenoids 18a and 18b are each energized from the battery through master switch 15, automatic switch 41, and lead 46, and are respectively connected by leads 50 and 51 through limit switches 97b and 97a to the negative side of the battery. When the clutch is in neutral position, the limit switches are both closed so that both solenoids are energized and both latches operative to prevent movement of the controller 11 beyond the positions wherein clutch-engaging contacts 31 or 33 are bridged, thus also preventing any substantial opening of the throttle.

During movement of the clutch to forward engaged position, movement of switch arm 76 to the left by cam 74 automatically opens limit switch 97a after the clutch has been engaged. The circuit through solenoid 18b is thereby opened, releasing the corresponding latch so that controller 11 can be moved further to the left, when desired, in order to advance the throttle. Limit switch 97b, however, remains closed so that the circuit of solenoid 18a remains established.

However, as stated above, with reference to Fig. 7, movement of the lever 11 beyond the position in which it engages the latch of solenoid 18b and the contacts 31, opens switch 41 in the control station C, so that solenoid 18a is also deenergized, and neither of the solenoids interferes with the operation of the compass. Solenoid 18a is, of course, reenergized whenever the lever 11 is moved to the right to close the engine throttle whenever it reaches or passes the point where contacts 31 are engaged, whereby the throttle is adjusted substantially to idling speed setting. Accordingly, the latch controlled by solenoid 18a, which is adapted to prevent movement of the lever 11 to the right beyond the position in which contacts 33 are engaged, is reenergized by reclosing of switch 41 whenever the throttle is reduced to idling adjustment or lever 11 is moved so as to operate the clutch to neutral or reverse engaged position. Thus the latch of solenond 18a normally prevents advancement of the engine throttle by movement of the controller 11 to the right beyond contacts 33, until the clutch is engaged for reverse operation.

If, however, the latch of solenoid 18a fails to operate rapidly enough, due to inertia of the moving parts, to arrest the lever 21 and controller 11 in the said contact-engaging position and the controller is inadvertently moved beyond this position, extensions 33a on contacts 33 continue to maintain the energizing circuit to electromagnet 86, through initiating switch 94b, so that despite such movement of the controller 11, the motor continues to be energized to move the clutch to reverse engaged position, and the desired operation is assured.

It will be seen from the wiring diagram that the switch 41 is adapted not only to deenergize the circuits through solenoids 18a and 18b, but also the control circuits through limit switches 92a and 92b and 96a and 96b so that as long as the controller 11 is maintained in partly or fully advanced throttle adjusting range with the clutch engaged for forward operation, as under normal cruising conditions, the control circuits (specifically relay 93b as well as latch solenoid 18a) are deenergized, preventing any undue drain on the battery. The motor power circuits, however, and the circuit through the signal lamp are not directly controlled by switch 41, but are independently controlled by motor switches 80, 81, 82 and 83 and lamp switches 90 and 91.

Variations and modifications may be made within the scope of this invention and portions of the improvements may be used without others.

I claim:

1. In a control station, a common controller for initiating a pair of operations alternately and for effecting a secondary operation; a pair of means respectively preventing operation of said controller to effect said secondary operation until the corresponding alternate operation is completed, one of said means thereupon becoming inoperative so as to permit said controller to effect said secondary operation; and means made operative by movement of the controller for also rendering the other preventing means inoperative after completion of the same one of said alternate operations which resulted in rendering the first "one of said means" inoperative.

2. In a control station, a common controller for alternately initiating a pair of reversible operations and for effecting a secondary operation; a pair of means respectively preventing operation of said controller to effect said secondary operation until a corresponding alternate operation is completed, one of said means thereupon becoming inoperative so as to permit said controller to effect said secondary operation; and means made operative by movement of the controller for also rendering the other preventing means inoperative after completion of the same one of said alternate operations which resulted in rendering the first "one of said means" in operative, and rendering both preventing means again operative in response to controller operation for reversing either of said alternate reversible operations.

3. In a control station, a common controller for initiating a pair of operations alternately and for reversibly effecting a reversible secondary operation; a pair of means respectively preventing operation of said controller to effect said secondary operation until a corresponding alternate operation is completed, one of said means thereupon becoming inoperative so as to permit said controller to effect said secondary operation; and means made operative by movement of the controller for also rendering the other preventing means inoperative after completion of the same one of said alternate operations which resulted in rendering the first "one of said means" inoperative, said means making the latter preventing means operative again upon operation of the controller to effect the reverse of said secondary operation.

4. In a control station, a common controller for initiating a pair of operations alternately and for effecting a secondary operation; a pair of means respectively preventing operation of said controller to effect said secondary operation until a corresponding one of alternate operations is completed, one of said means thereupon becoming inoperative so as to permit said controller to effect said secondary operation; means for rendering the other preventing means inoperative in response to controller operation for effecting said secondary operation after completion of said one of said alternate operations; and means for maintaining said controller operative to effect at least one of said alternate operations, simultaneously with said secondary operation, should the preventing means fail to operate.

5. In a remote control station having a common controller for operating the reverse gear to move a clutch between a neutral disengaged position and alternate engaged positions, and for adjusting the throttle of an engine coupled with the clutch, concurrently with said reverse gear control; dual means normally preventing movement of the controller to advance the throttle until the clutch is engaged, said dual means becoming alternately inoperative in response to engagement of the clutch for operation respectively in opposite directions; and means for automatically rendering both of said preventing means inoperative upon movement of the controller to advance the throttle after the controller is released by one of said preventing means.

6. In a remote control station having a common controller for operating the reverse gear to move a clutch between a neutral disengaged position and alternate engaged positions, and for adjusting the throttle of an engine coupled with the clutch, concurrently with said reverse gear control; dual means normally preventing movement of the controller to advance the throttle from idling setting until the clutch is engaged, said dual means becoming alternately inoperative in response to engagement of the clutch for operation respectively in opposite directions; and means for automatically rendering both of said preventing means inoperative upon movement of the controller to advance the throttle beyond idling setting after the controller is released by one of said preventing means, the latter preventing means becoming automatically operative again upon movement of the controller substantially to idling throttle setting.

7. In a remote control station having a common controller for operating the reverse gear to move a clutch between a neutral disengaged position and alternate engaged positions, and for adjusting the throttle of an engine coupled with the clutch, concurrently with said reverse gear control; dual means normally preventing movement of the controller to advance the throttle until the clutch is engaged, said dual means becoming alternately inoperative in response to engagement of the clutch for operation respectively in opposite directions; and means for automatically rendering both of said preventing means inoperative upon movement of the controller to advance the throttle after the controller is released by one of said preventing means, the latter preventing means becoming automatically operative again upon movement of the controller substantially to idling throttle setting, and each of said preventing means becoming operative again upon return of the clutch to neutral position.

8. In a remote control station having a common controller for operating the reverse gear to move a clutch between a neutral disengaged position and alternate engaged positions, and for adjusting the throttle of an engine coupled with the clutch concurrently with said reverse gear control; dual means normally preventing movement of the controller to advance the throttle until the clutch is engaged, said dual means becoming alternately inoperative in response to engagement of the clutch for operation respectively in opposite directions; means for automatically rendering both of said preventing means inoperative upon movement of the controller to advance the throttle after the controller is released by the other preventing means; and means for effecting engagement of the clutch after advancement of the throttle should one of said preventing means fail to operate.

9. In a remote control station having a common controller for operating the reverse gear to move a clutch between neutral disengaged position and alternate forward and reverse engaged positions and for adjusting the throttle of an engine coupled with the clutch concurrently with said reverse gear control; dual means normally preventing movement of the controller to advance the throttle until the clutch is engaged, said means becoming respectively inoperative upon engagement of the clutch for forward or reverse operation and thereby releasing the controller for advancing the throttle setting; and means for automatically rendering both preventing means inoperative upon advancement of the throttle after engagement of the clutch for forward operation.

10. In a marine control station having a common controller for operating a reverse gear to move a clutch between neutral or disengaged positions and alternate forward and reverse engaged positions and for adjusting the throttle of an engine coupled with the clutch concurrently with said reverse gear control; dual electromagnetic means normally energized to prevent the controller from materially advancing the throttle until the clutch is engaged; means for deenergizing said electromagnetic means, one at a time, upon engagement of the clutch for operation respectively in opposite directions, so as to permit said controller to advance the throttle as long as the clutch remains engaged; and means responsive to advancement of the throttle while the clutch is engaged for forward operation, to deenergize the other electromagnetic means as long as said throttle is advanced and the clutch continues in forward engagement.

11. In a marine control station having a common controller for operating a reverse gear to move a clutch between neutral or disengaged positions and alternate forward and reverse engaged positions, and for adjusting the throttle of an engine coupled with the clutch concurrently with said reverse gear control; dual electromagnetic means normally energized to prevent the controller from materially advancing the throttle until the clutch is engaged; means for deenergizing said electromagnetic means, one at a time, upon engagement of the clutch for operation respectively in opposite directions to permit said controller to advance the throttle while the clutch remains engaged; and means responsive to advancement of the throttle while the clutch is engaged in either position for deenergizing the other electromagnetic means as long as the clutch continues engaged and the throttle advanced.

12. In a marine control station having a controller for electric operation of the clutch between engaged and disengaged position and for concurrently controlling the throttle of an engine coupled with the clutch, electric circuit control means operated by the controller to disengage the clutch upon adjustment of the throttle to a predetermined low speed setting; electromagnetic means normally operative as long as the clutch is disengaged to prevent advancement of the throttle setting materially above said low speed adjustment, said electromagnetic means being deenergized in response to engagement of the clutch; and circuit control means operated by the throttle for engaging the clutch upon predetermined movement of the controller in throttle advancing direction within its reduced throttle adjusting range, said latter circuit control means continuing to be operative to engage the clutch upon advancement of the throttle beyond said reduced setting by the controller, so as to insure engagement of the clutch and deenergization of said electromagnetic means should the latter fail to prevent advancement of the throttle before the clutch is engaged.

13. In a marine control station having a common controller for operation of a reverse gear to move a clutch between alternate engaged positions and for concurrently controlling the throttle of the engine coupled with the clutch; electric circuit control means alternately operated by the controller to shift the clutch from one engaged position to the other and vice versa; a pair of electromagnetic means normally energized to prevent advancement of the throttle setting beyond a predetermined low speed adjustment as long as the reverse gear is disengaged, one or the other of said respective electromagnetic means being deenergized in response to engagement of the clutch in said alternate positions respectively to permit said controller to advance the throttle; means for automatically deenergizing the second electromagnetic means upon movement of the controller to advance the throttle beyond said predetermined setting following engagement of the clutch in one of said positions, said means normally reenergizing said second electromagnetic means upon controller operation to reduce the throttle setting to said low speed range without shifting the reverse gear; and means cooperating with the circuit control means which is adapted to shift the reverse gear to the alternate engaged position for retaining the latter operative to shift the clutch while the throttle is advanced should said second electromagnetic means fail to prevent advancement of the throttle before the reverse gear clutch is oppositely engaged.

14. In a marine control station having a common controller for operation of a reverse gear to move a clutch between alternate engaged positions and for concurrently controlling the throttle of an engine coupled with the clutch; means alternately operated by the controller to shift the clutch from one engaged position through a disengaged position to the opposite engaged position and vice versa; a pair of electromagnetic means normally energized to prevent advancement of the throttle above a predetermined low speed setting as long as the reverse gear is disengaged, said electromagnetic means being deenergized respectively in response to engagement of the clutch in said respective alternate positions so as to permit said controller to advance the throttle; and means for automatically deenergizing both of said electromagnetic means upon movement of the controller to advance the throttle beyond said predetermined low speed setting following engagement of the clutch in at least one position, said means normally reenergizing the last deenergized electromagnetic means upon operation of the controller to reduce the throttle to said low speed setting.

15. In a marine control station having a common controller for operation of a reverse gear to move a clutch between alternate engaged positions and for concurrently controlling the throttle of an engine coupled with the clutch; means alternately operated by the controller to shift the clutch from one engaged position through a disengaged position to the opposite engaged position and vice versa; a pair of electromagnetic means normally energized to prevent advancement of the throttle above a predetermined low speed setting as long as the reverse gear is disengaged, said electromagnetic means being deenergized respectively in response to engagement of the clutch in said respective alternate positions so as to permit said controller to advance the throttle; and means for deenergizing both electromagnetic means in response to controller operation to advance the throttle beyond said predetermined low speed setting following engagement of the clutch in either of its engaged positions, said means reenergizing the electromagnetic means for preventing advancement of the throttle in the opposite engaged position upon movement of the controller to reduce the throttle setting to said low speed range.

16. In a marine control station having a common controller for operation of a reverse gear to move a clutch betwen alternate engaged positions and for concurrently controlling the throttle of an engine coupled with the clutch; means alternately operated by the controller to shift the clutch from one engaged position through a disengaged position to the opposite engaged position and vice versa; a pair of electromagnetic means normally energized to prevent advancement of the throttle above a predetermined low speed setting as long as the reverse gear is disengaged, said electromagnetic means being deenergized respectively in response to engagement of the clutch in said respective alternate positions so as to permit said controller to advance the throttle; and means for automatically deenergizing both of said electromagnetic means upon movement of the controller to advance the throttle beyond said predetermined low speed setting following engagement of the clutch in at least one of its positions, said means normally reenergizing the last deenergized electromagnetic means upon operation of the controller to reduce the throttle to said low speed setting, said means also deenergizing the electric control circuits for shifting the clutch simultaneously with deenergization of both of said electromagnetic means and reenergizing said control circuits upon reenergization of one of said electromagnetic means.

17. In a marine control station having a common controller for operation of a reverse gear to move a clutch between alternate engaged positions and for concurrently controlling the throttle of an engine coupled with the clutch; means alternately operated by the controller to shift the clutch from one engaged position through a disengaged position to the opposite engaged position and vice versa; a pair of electromagnetic means normally energized to prevent advancement of the throttle above a predetermined low speed setting as long as the reverse gear is disengaged, said electromagnetic means being deenergized respectively in response to engagement of the clutch in said respective alternate positions to permit said controller to advance the throttle; and means to deenergize both electromagnetic means in response to controller operation to advance the throttle beyond said predetermined low speed setting following engagement of the clutch in either of its engaged positions, said means reenergizing the electromagnetic means for preventing advancement of the throttle in the opposite engaged position upon movement of the controller to reduce the throttle setting to said low speed range, said means also deenergizing the electric control circuits for shifting the clutch simultaneously with deenergization of both of said electromagnetic means and reenergizing said control circuits upon reenergization of one of said electromangetic means.

18. In a marine control station having a common controller for operation of a reverse gear to move a clutch between alternate engaged positions through an intermediate disengaged position and for concurrently controlling the throttle of an engine coupled with the clutch, electric contact means cooperating with the controller to disengage the clutch upon movement of the controller to a position within a predetermined low-speed throttle-setting range; alternate electric contact means cooperating with the controller to engage the clutch in opposite engaged positions upon alternate movement of the controller relative to the first-named contact means within said predetermined low-speed throttle-setting range; a pair of electromagnetic latch means normally energized to retain the controller within said low speed clutch-operating range as long as the clutch is disengaged, one or the other of said electromagnetic latch means being deenergized to release the controller for advancement of the throttle in response to engagement of the clutch for operation in respective opposite directions, said latch means being reenergized upon disengagement of the clutch; and switch means automatically operated by the controller upon movement thereof to advance the throttle beyond said low speed setting after release of the corresponding electromagnetic latch means in at least one of its clutch-engaging positions, to render both electromagnetic latch means inoperative until the throttle is again reduced to said low speed range, said means simultaneously deenergizing said clutch-operating contact means, said switch means reenergizing the last deenergized latch means and the clutch-operating contacts upon return of the controller to low speed throttle setting range, at least that one of said alternate contact means, which is adapted to move the clutch to the opposite engaged position from that in which both of said latches are rendered inoperative by advancement of the throttle being shaped to cooperate with the controller to remain operative to engage the clutch upon movement of the controller to advanced throttle setting position in said opposite clutch-engaging position.

19. In a remote control system for reverse gears for engines, a common controller for operating the reverse gear to move a clutch between a neutral disengaged position and either forward or reverse engaged positions and for adjusting the throttle of an engine coupled with the clutch; dual means normally preventing the movement of the controller to advance the throttle until the clutch is engaged and becoming alternately inoperative in response to engagement of the clutch for operation respectively in opposite directions; means for automatically rendering both said preventing means inoperative upon movement of the controller to advance the throttle after the controller is released by one of said preventing means; circuit control means operated by the controller to cause disengagement of the clutch upon adjustment of the throttle to a predetermined low setting; and circuit control means alternately cooperating with said controller to cause engagement of the clutch upon predetermined movement of the controller to either forward or reverse controlling position, said alternate circuit control means continuing to remain operative to cause engagement of the clutch for operation in the direction desired regardless of the extent to which the throttle setting is advanced.

20. In a remote control system for reverse gears for engines, a common controller for operating the reverse gear to move a clutch between a neutral disengaged position and either forward or reverse engaged positions and for adjusting the throttle of an engine coupled with the clutch; means normally preventing the movement of the controller to advance the throttle until the clutch is engaged and becoming inoperative in response to engagement of the clutch; means for automatically rendering said preventing means inoperative upon movement of the controller to advance the throttle after the controller is released by said preventing means; circuit control means operated by the controller to cause disengagement of the clutch upon adjustment of the throttle to a predetermined low setting; and circuit control means alternately cooperating with said controller to cause engagement of the clutch upon predetermined movement of the controller to either forward or reverse controlling position, said alternate circuit control means continuing to remain operative to cause engagement of the clutch for operation in the direction desired regardless of the extent to which the throttle setting is advanced.

ERWIN J. PANISH.

REFERENCES CITED

The following references are of record in the file of this patent:

UNITED STATES PATENTS

| Number | Name | Date |
|---|---|---|
| 1,667,842 | Coykendall | May 1, 1928 |
| 2,235,943 | Mylius | Mar. 25, 1941 |
| 2,238,574 | Thomas et. al. | Apr. 15, 1941 |
| 2,254,144 | Higgins | Aug. 26, 1941 |

FOREIGN PATENTS

| Number | Country | Date |
|---|---|---|
| 429,213 | Great Britain | May 27, 1935 |